United States Patent
Huang

(10) Patent No.: US 8,106,960 B2
(45) Date of Patent: Jan. 31, 2012

(54) IMAGE PROCESSING SYSTEM AND METHOD THEREOF

(75) Inventor: Han-Cheng Huang, Taipei County (TW)

(73) Assignee: Silicon Motion Inc., Jhubei (TW)

( * ) Notice: Subject to any disclaimer, the term of this patent is extended or adjusted under 35 U.S.C. 154(b) by 370 days.

(21) Appl. No.: 12/425,388

(22) Filed: Apr. 17, 2009

(65) Prior Publication Data
US 2010/0201825 A1    Aug. 12, 2010

(30) Foreign Application Priority Data
Feb. 11, 2009  (TW) .............................. 98104300 A

(51) Int. Cl.
*H04N 5/228* (2006.01)
(52) U.S. Cl. .................. 348/222.1; 348/230.1
(58) Field of Classification Search .................. None
See application file for complete search history.

(56) References Cited

U.S. PATENT DOCUMENTS

| 7,595,805 B2 * | 9/2009 | Molloy | 345/560 |
| 2006/0140498 A1 * | 6/2006 | Kudo et al. | 382/254 |

* cited by examiner

*Primary Examiner* — David Ometz
*Assistant Examiner* — Angel L Garces-Rivera
(74) *Attorney, Agent, or Firm* — Winston Hsu; Scott Margo

(57) ABSTRACT

An image processing system includes a receiving unit and an image processing unit, where the image processing unit includes a plurality of line buffers. The receiving unit is utilized for receiving a rectangular image. The image processing unit is coupled to the receiving unit, and is utilized for receiving at least a portion of the rectangular image transmitted from the receiving unit, where the first image processing unit receives the portion in a line-based manner, and a length of each line is equivalent to a length of a short side of the rectangular image. In particular, each line buffer of the image processing unit is utilized for storing pixel data of one line of the rectangular image.

13 Claims, 5 Drawing Sheets

IMAGE PROCESSING SYSTEM AND METHOD THEREOF

BACKGROUND OF THE INVENTION

1. Field of the Invention

The present invention relates to an image processing system, and more particularly, to an image processing system having a reduced size of line buffers, and to an associated image processing method.

2. Description of the Prior Art

In a conventional image sensor, an image received by the image sensor is typically transmitted to a plurality of line buffers line by line. Then, image data in the line buffers is typically transmitted to an image processing unit block by block, and is then image-processed to generate an image frame. Finally, the image frame is transmitted from the image processing unit to a display apparatus to be displayed thereon. Please refer to FIG. 1. FIG. 1 is a diagram illustrating how a conventional image sensor transmits an image to line buffers. As shown in FIG. 1, the image sensor transmits the received rectangular image 110 to eight line buffers 120_1-120_8 line by line. Each of the line buffers 120_1-120_8 is used for storing pixel data of a line, and a size of each of the line buffers 120_1-120_8 is therefore equal to the data amount of the pixels of the line. However, due to the increase of the resolution supported by the image sensor and the popularization of wide-screen displays, the number of pixels of a line of the rectangular image 110 is increased. As a result, the size of each of the line buffers should be greater than before, causing an increased manufacturing cost.

SUMMARY OF THE INVENTION

It is therefore an objective of the present invention to provide an image processing system having a reduced size of line buffers, and to provide an associated image processing method, in order to solve the above-mentioned problems.

According to one embodiment of the present invention, an image processing system comprises a receiving unit and an image processing unit, where the image processing unit comprises a plurality of line buffers. The receiving unit is utilized for receiving a rectangular image. The image processing unit is coupled to the receiving unit, and is utilized for receiving at least a portion of the rectangular image transmitted from the receiving unit, wherein the first image processing unit receives the portion in a line-based manner, and a length of each line is equivalent to a length of a short side of the rectangular image. In particular, each line buffer of the image processing unit is utilized for storing pixel data of one line of the rectangular image.

According to another embodiment of the present invention, an image processing method comprises: receiving a rectangular image; and receiving at least a portion of the rectangular image in a line-based manner, wherein a length of each line is equivalent to a length of a short side of the rectangular image. In particular, pixel data of one line of the rectangular image is stored into a line buffer.

According to the image processing system and the image processing method of the present invention, the size of the line buffers required for implementation is smaller than that of the related art, and the manufacturing cost is therefore decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
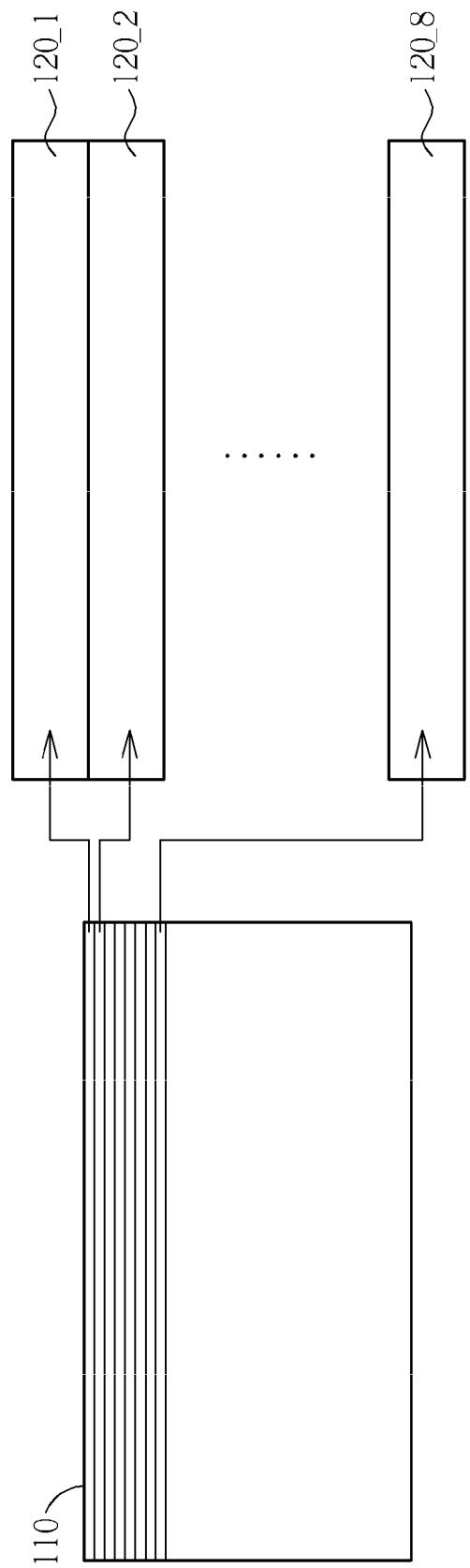
FIG. 1 is a diagram illustrating how a conventional image sensor transmits an image to line buffers.
Figure 2:
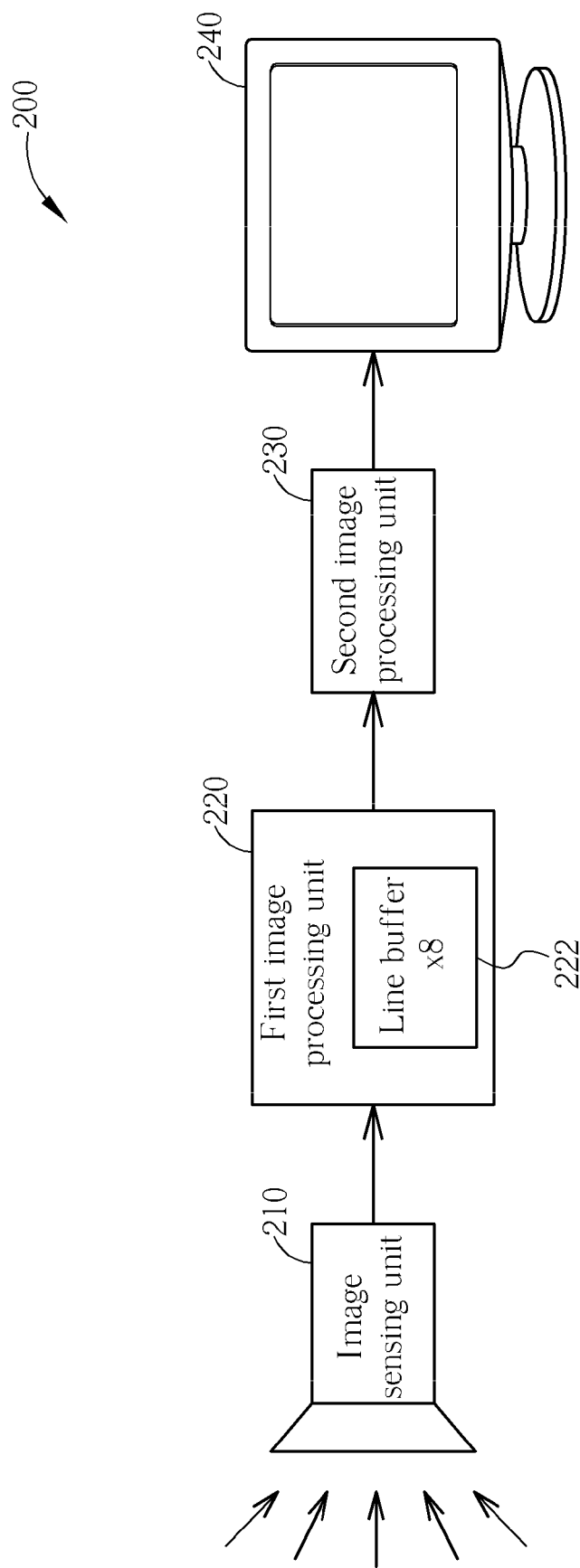
FIG. 2 is a diagram illustrating an image processing system according to one embodiment of the present invention.

FIG. 2 is a diagram illustrating an image processing system 200 according to one embodiment of the present invention. As shown in FIG. 2, the image processing system 200 comprises a receiving unit such as an image sensing unit 210, a first image processing unit 220, a second image processing unit 230 and a display apparatus 240, where the first image processing unit 220 comprises a plurality of line buffers 222 (e.g. eight line buffers, where the line buffer count thereof is not a limitation of the present invention). In practice, the image sensing unit 210 can be a CCD (Charge Coupled Device) image sensor or a CMOS (Complementary Metal-Oxide Semiconductor) image sensor, and the second image processing unit 230 can be implemented by application programs or a driving circuit.

Figure 3:
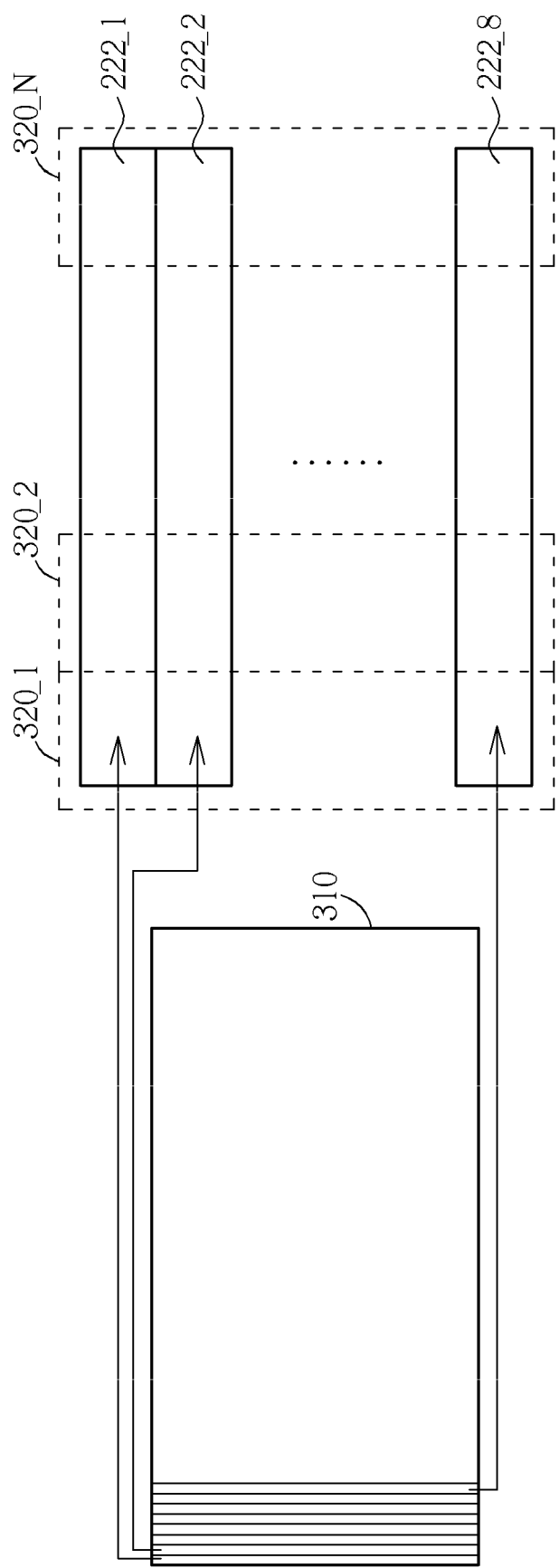
FIG. 3 is a diagram illustrating how the image sensing unit transmits an image to eight line buffers.

Please refer to FIG. 2 and FIG. 3 together. FIG. 3 is a diagram illustrating how the image sensing unit 210 transmits an image to eight line buffers 222_1-222_8. Regarding the operations of the image processing system 200, first, the image sensing unit 210 detects and receives a rectangular image 310, where the rectangular image comprises 1280*720 pixels. Then, the first image processing unit 220 receives the rectangular image 310 from the image sensing unit 210 in a line-based manner, where a length of each line is equivalent to a length of a short side of the rectangular image 310. In addition, the first image processing unit 220 can receive the rectangular image 310 line by line or receive the rectangular image 310 according to a predetermined order. In this embodiment, the first image processing unit 220 receives the rectangular image 310 line by line. When pixel data of the $1^{st}$-$8^{th}$ lines of the rectangular image 310 is respectively stored into the line buffers 222_1-222_8, the first image processing unit 220 outputs N data blocks 320_1-320_N to the second image processing unit 230 according to the pixel data of the $1^{st}$-$8^{th}$ lines stored in the line buffers 222_1-222_8. In this embodiment, each of the line buffers 222_1-222_8 stores pixel data of 720 pixels, and each data block comprises 8*8 pixels (i.e., the first image processing unit 220 outputs ninety data blocks to the second image processing unit 230). After that, the second image processing unit 230 sequentially receives the data blocks 320_1-320_N, and combines the data blocks 320_1-320_N to generate the pixel data of the $1^{st}$-$8^{th}$ lines.

Figure 4:
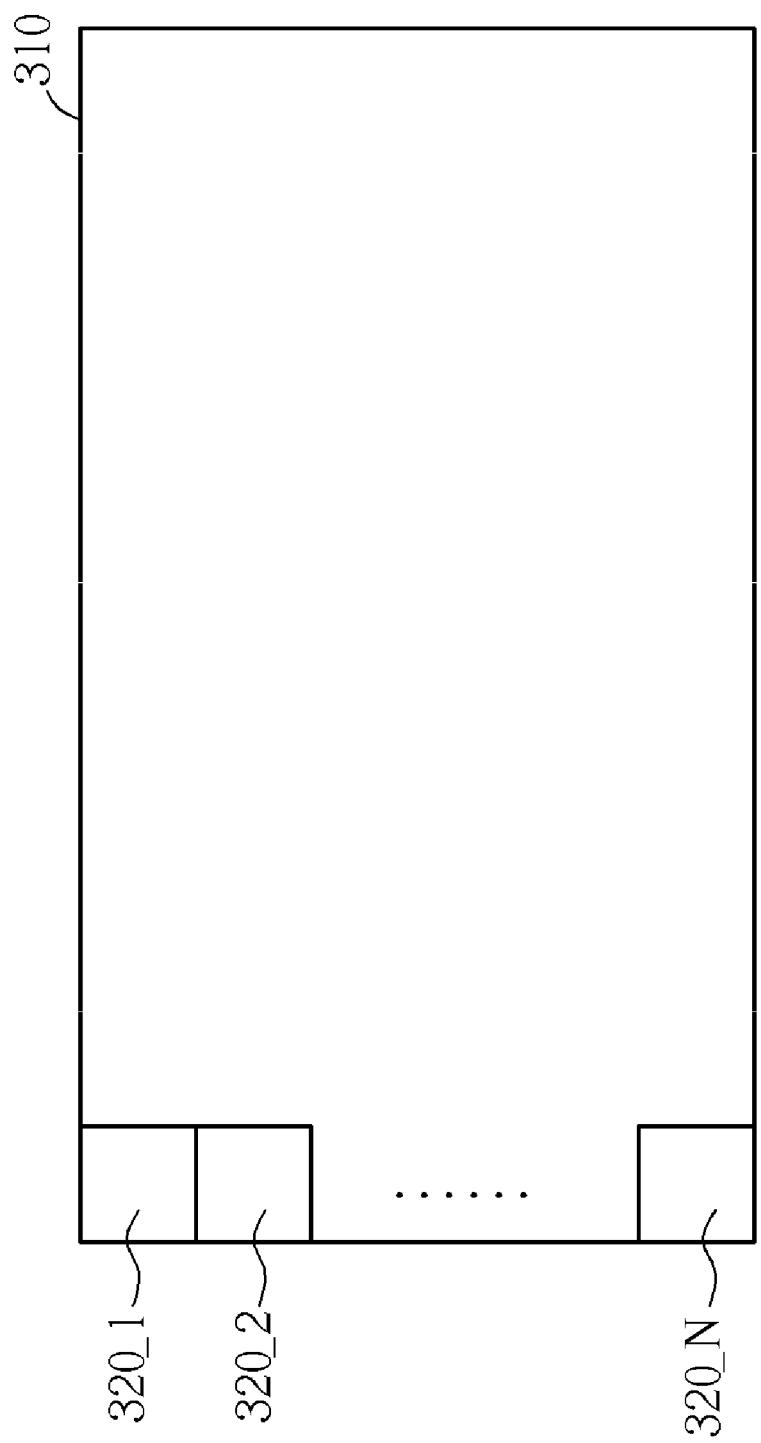
FIG. 4 is a diagram illustrating how the second image processing unit combines the data blocks to generate the pixel data of a plurality of lines.

Please refer to FIG. 4. FIG. 4 is a diagram illustrating how the second image processing unit 230 combines the data blocks to generate the pixel data of a plurality of lines. In this embodiment, the second image processing unit 230 combines the data blocks 320_1-320_N to generate the pixel data of the $1^{st}$-$8^{th}$ lines. In other words, the second image processing unit 230 generates the pixel data of the $1^{st}$ to $8^{th}$ lines on the short side of the rectangular image 310 according to relative positions of the data blocks 320_1-320_N on the rectangular image 310. After that, the image sensing unit 210 transmits pixel data of the $9^{th}$-$16^{th}$ lines of the rectangular image 310 to the line buffers 222_1-222_8. As a result, the pixel data of the $9^{th}$-$16^{th}$ lines of the rectangular image 310 is stored in the line buffers 222_1-222_8. Then, the first image processing unit 220 outputs N data blocks to the second image processing unit 230 according to the pixel data of the $9^{th}$-$16^{th}$ lines stored in the line buffers 222_1-222_8. After that, the second image processing unit 230 sequentially receives and combines the N data blocks to generate the pixel data of the $9^{th}$-$16^{th}$ lines on the short side according to the same method described above by referring to FIG. 4. Then, pixel data of the other lines undergoes the same operations as the pixel data of the $1^{st}$-$8^{th}$ lines and the $9^{th}$-$16^{th}$ lines of the rectangular image 310 described above. Finally, when all the data blocks of the rectangular image 310 are transmitted to the second image processing unit 230, the second image processing unit 230 generates a rectangular image frame (i.e., the rectangular image 310) according to all the above data blocks, and the rectangular image frame is transmitted to the display apparatus 240 to be displayed thereon.

It is noted that, the embodiments shown in FIG. 3 and FIG. 4 are merely for illustrative purposes only. In other embodiments of the present invention, the first image processing unit 220 can receive the rectangular image 310 outputted from the image sensing unit 210, starting from the right side to the left side of the rectangular image 310 line by line, or receive the rectangular image 310 in a line-based manner according to a predetermined and discontinuous order. These alternative designs all fall within the scope of the present invention.

In addition, the image processing system 200 is capable of displaying the rectangular image 310 received by the image sensing unit 210 on the display apparatus 240. Therefore, the present invention is preferred to be applied to an image processing system having a wide-screen display. Taking a wide-screen display having a resolution of 1280*720 pixels as an example, in the conventional image processing system, each line buffer 120_1-120_8 needs to store pixel data of 1280 pixels, that is, the required storage capacity of each line buffer 120_1-120_8 is equal to the data amount of 1280 pixels. However, in the image processing unit 200 of the present invention, each of the line buffers 222_1-222_8 only needs to store pixel data of 720 pixels, that is, the required storage capacity of each line buffer 222_1-222_8 is equal to the data amount of 720 pixels. Therefore, the size of the line buffers is greatly decreased. As a result of implementing according to the present invention, the manufacturing cost can be reduced in contrast to the related art.

It is noted that, in the above descriptions regarding the rectangular image 310 displayed on the display apparatus 240, for a user of the display apparatus 240, a long side of the rectangular image 310 is approximately aligned to a horizontal line, and the short side of the rectangular image 310 is approximately aligned to a vertical line.

In addition, in other embodiments of the present invention, the first image processing unit 220 can receive a rectangular image from another image sensing unit or a storage device. In addition, a transmission medium between the first image processing unit 220 and the second image processing unit 230 can be a network cable, an USB (Universal Serial Bus), or any wired/wireless transmission medium capable of transmitting images. These alternative designs all fall within the scope of the present invention.

Figure 5:
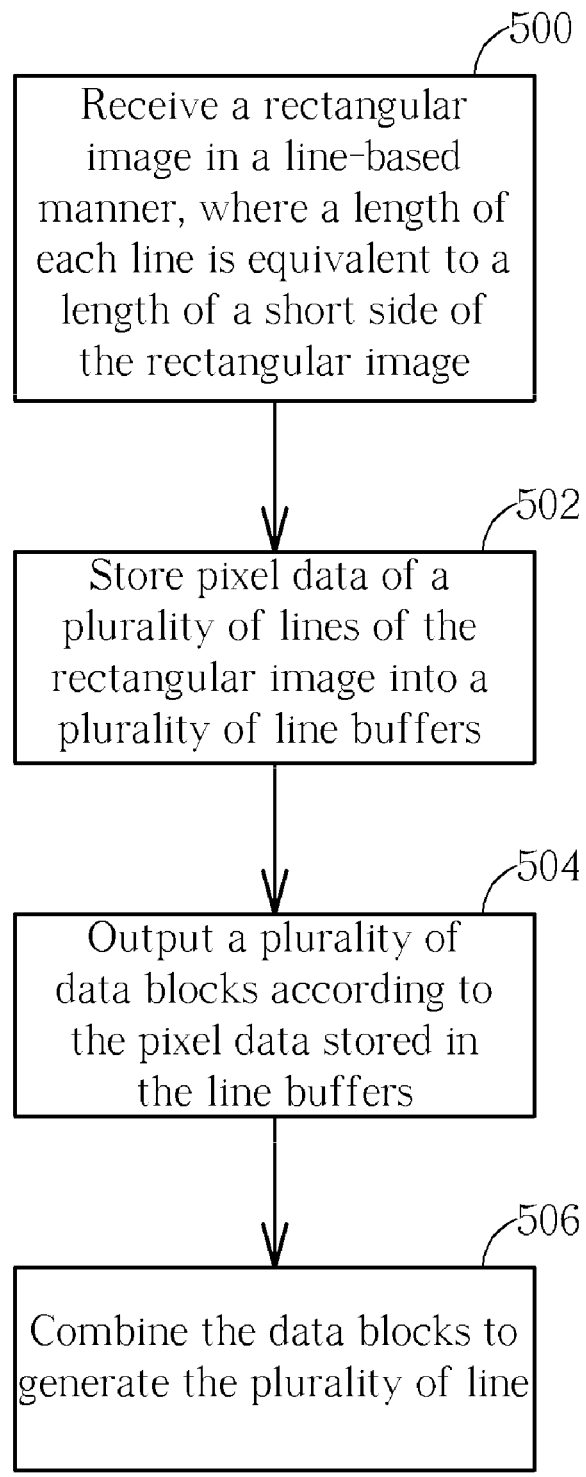
FIG. 5 is a flowchart of an image processing method according to one embodiment of the present invention.

Please refer to FIG. 5. FIG. 5 is a flowchart of an image processing method according to one embodiment of the present invention. The steps are described as follows:

Step 500: receive a rectangular image in a line-based manner, where a length of each line is equivalent to a length of a short side of the rectangular image.

Step 502: Store pixel data of a plurality of lines of the rectangular image into a plurality of line buffers.

Step 504: Output a plurality of data blocks according to the pixel data stored in the line buffers.

Step 506: Combine the data blocks to generate the plurality of lines.

Briefly summarizing the image processing system of the present invention, the first image processing unit is utilized for receiving the rectangular image from the image sensing unit in a line-based manner, where a length of each line is equivalent to a length of a short side of the rectangular image. In addition, each line buffer of the image processing unit is utilized for storing pixel data of a line of the rectangular image. According to the image processing system of the present invention, the required size of the line buffers is decreased, and the manufacturing cost is therefore lowered in contrast to the related art.

Those skilled in the art will readily observe that numerous modifications and alterations of the device and method may be made while retaining the teachings of the invention.

What is claimed is:

1. An image processing system, comprising:
    a receiving unit, for receiving a rectangular image, wherein when the rectangular image is displayed on a display region of a display apparatus, a long side of the rectangular image is parallel with a long side of the display region, and a short side of the rectangular image is parallel with a short side of the display region; and
    a first image processing unit, coupled to the receiving unit, for receiving at least a portion of the rectangular image transmitted from the receiving unit, wherein the first image processing unit receives the portion in a line-based manner, and a length of each line is equivalent to a length of the short side of the rectangular image.

2. The image processing system of claim 1, wherein the first image processing unit receives at least the portion of the rectangular image line by line.

3. The image processing system of claim 1, wherein the first image processing unit receives at least the portion of the rectangular image according to a predetermined order.

4. The image processing system of claim 1, wherein the first image processing unit comprises:
    a plurality of line buffers, wherein each line buffer is utilized for storing pixel data of one line of the rectangular image.

5. The image processing system of claim 4, wherein each line of the rectangular image has a plurality of pixels, and a storage capacity of each line buffer is equal to a data amount of the plurality of pixels.

6. The image processing system of claim 4, wherein the first image processing unit outputs a plurality of data blocks according to pixel data of a plurality of lines of the rectangular image stored in the line buffers, and the image processing system further comprises:
    a second image processing unit, coupled to the first image processing unit, for sequentially receiving the plurality of data blocks and generating the pixel data of the lines by combining the data blocks.

7. The image processing system of claim 1, wherein the receiving unit is an image sensing unit.

8. An image processing method, comprising:
- receiving a rectangular image, wherein when the rectangular image is displayed on a display region of a display apparatus, a long side of the rectangular image is parallel with a long side of the display region, and a short side of the rectangular image is parallel with a short side of the display region; and
- receiving at least a portion of the rectangular image in a line-based manner, wherein a length of each line is equivalent to a length of the short side of the rectangular image.

9. The image processing method of claim 8, wherein the step of
- receiving at least the portion of the rectangular image in the line-based manner further comprises:
- receiving at least the portion of the rectangular image line by line.

10. The image processing method of claim 8, wherein the step of
- receiving at least the portion of the rectangular image in the line-based manner further comprises:
- receiving at least the portion of the rectangular image according to a predetermined order.

11. The image processing method of claim 8, wherein the step of
- receiving at least the portion of the rectangular image in the line-based manner further comprises:
- providing a plurality of line buffers, wherein each line buffer is utilized for storing pixel data of one line of the rectangular image.

12. The image processing method of claim 11, wherein each line of the rectangular image has a plurality of pixels, and a storage capacity of each line buffer is equal to a data amount of the plurality of pixels.

13. The image processing method of claim 11, further comprising:
- outputting a plurality of data blocks according to pixel data of a plurality of lines of the rectangular image stored in the line buffers; and
- sequentially receiving the plurality of data blocks and generating the pixel data of the lines by combining the data blocks.

* * * * *